United States Patent
Wasiewicz

(10) Patent No.: US 7,136,012 B2
(45) Date of Patent: Nov. 14, 2006

(54) APPROACH RADAR WITH ARRAY ANTENNA HAVING ROWS AND COLUMNS SKEWED RELATIVE TO THE HORIZONTAL

(75) Inventor: Richard Wasiewicz, Tully, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/404,193

(22) Filed: Apr. 1, 2003

(65) Prior Publication Data

US 2004/0196172 A1    Oct. 7, 2004

(51) Int. Cl.
   *G01S 13/00*    (2006.01)
   *G01S 3/32*     (2006.01)
   *H01Q 3/00*     (2006.01)

(52) U.S. Cl. .................. 342/33; 342/159; 342/359; 342/384

(58) Field of Classification Search ........... 342/33, 342/34, 39, 63, 74, 75, 159, 359, 368, 373, 342/380, 381, 383, 384
See application file for complete search history.

(56) References Cited

U.S. PATENT DOCUMENTS

| | | | |
|---|---|---|---|
| 2,419,609 | A | 4/1947 | Ullrich |
| 3,719,949 | A | 3/1973 | Hemmi |
| 4,021,812 | A | 5/1977 | Schell et al. |
| 4,150,383 | A | 4/1979 | Andersson et al. |
| 5,196,854 | A | 3/1993 | Matthews |
| 5,831,570 | A | 11/1998 | Ammar et al. |
| 5,841,391 | A * | 11/1998 | Lucas et al. ............. 342/34 |
| 5,907,568 | A | 5/1999 | Reitan, Jr. |
| 6,087,974 | A * | 7/2000 | Yu ............................ 342/62 |
| 6,169,518 | B1 | 1/2001 | Nelson et al. |
| 6,232,921 | B1 | 5/2001 | Aiken et al. |
| 6,404,379 | B1 * | 6/2002 | Yu et al. ................... 342/80 |
| 6,421,000 | B1 | 7/2002 | McDowell |
| 6,430,480 | B1 | 8/2002 | Ammar et al. |
| 2002/0012289 | A1 * | 1/2002 | Gilbert et al. ............ 367/135 |
| 2002/0042673 | A1 | 4/2002 | Ooga |
| 2003/0020646 | A1 * | 1/2003 | Yu ............................ 342/17 |
| 2003/0206132 | A1 * | 11/2003 | Phelan et al. ............ 342/157 |
| 2005/0104769 | A1 * | 5/2005 | Tietjen ..................... 342/174 |

FOREIGN PATENT DOCUMENTS

| | | |
|---|---|---|
| JP | 62263484 | 11/1987 |
| JP | 3115886 | 5/1991 |
| JP | 3170891 | 7/1991 |
| JP | 3170892 | 7/1991 |
| JP | 3242579 | 10/1991 |

(Continued)

OTHER PUBLICATIONS

AN/FPN-16 Precision Approach Radar and Shelter, www.wpafb.af.mil/museum/vfe/vfe12.htm.

(Continued)

*Primary Examiner*—Thomas H. Tarcza
*Assistant Examiner*—Isam Alsomiri
(74) *Attorney, Agent, or Firm*—Plevy, Howard & Darcy, PC

(57) ABSTRACT

A monopulse precision landing or other land-based radar system uses an array antenna and a beamformer to produce sum, azimuth difference and elevation difference beams relative to the array. The rows and columns of the array are skewed relative to the horizontal for tending to reduce the effects of multipath propagation on altitude estimates. A coordinate converter converts target information from the skewed antenna coordinates to ordinary vertical and horizontal coordinates.

11 Claims, 8 Drawing Sheets

FOREIGN PATENT DOCUMENTS

| | | |
|---|---|---|
| JP | 8304534 | 11/1996 |
| WO | WO 90/04795 | 5/1990 |
| WO | WO 98/22834 | 5/1998 |
| WO | WO 98/57193 | 11/1998 |
| WO | WO 01/86229 | 10/2002 |

OTHER PUBLICATIONS

ITT Industries, Gilfillan—Ground Controlled Approach/Precision. www.gilfillan.itt.com/par2000.htm.

Airline Transport Pilots License (060 00 00 00—Navigation) Jar . . . p. 1. Airline Transport Pilots License (060 00 00 00-Navigation)First Issue 062-RN-Sep. 1, 1999, JAR-FCL REF No Learning Objectives www.dgac.fr/html/prospace/exam/verg%E9/lo062.PDF.

Raytheon: Product or Service Name Home > Products & Services > > AN/FPN-67 Fixed-Base Precision Approach Radar (FBPAR). www.raytheon.com/products/fbpar.

Precision Approach Radar. www.radarpages.co.uk/mob/navaids/par/par1.htm.

AN/TPN-22 Precision Approach Radar (PAR). www.fas.org/man/dod-101/sys/ac/equip/an-tpn-22.htm.

Sierra Nevada Corporation, AN/PN-35C Precision Approach Radar Modification Program. www.sncorp.com/atc4.html.

Raytheon Journal of Aerospace and Defense Industry News. Dec. 29, 1999. Business News. Rayatheon successfully completes fixed-base precision approach radar flight testing. www.aerotechnews.com/starc/1999/122999/Raytheon.html.

Portable Radars Research Enterprise "MobilRadar Ltd". http://mobilradar.narod.ru/english.html.

Joint Precision Approach and Landing System (JPALS) Precision . . . Federal Radionavigation Plan. Precision Approach Radar (PAR) http://www.fas.org/man/dod-101/sys/ac/equip/ipals.htm.

ESC Press Release—ESC to acquire enhanced air traffic control system . http://eschq.hanscom.af.mil/Esc-PA/news/2002/Jan%202002/ESC%2002-04.htm.

Lockheed Martin Wins Competition for US Marine Corps Mobile Air. http://www.lockheedmartin.com/syracuse/news/ASPARCS.htm.

04B-mod AG System (DAAS) Voice Communication Switching System (VCSS) Digital Airport Surveillance Radar (DASR) Fixed-Base Precision Approach Radar (FBPAR) Tactical http://webportal.saalt.army.mil/sard-zs/saal zs public docs/weapon systems handbook/*wsh pdfs/at c.pdf.

\* cited by examiner

HEIGHT ESTIMATION ERROR

APPROACH RADAR WITH ARRAY ANTENNA HAVING ROWS AND COLUMNS SKEWED RELATIVE TO THE HORIZONTAL

CROSS-REFERENCE TO RELATED APPLICATIONS

No related applications.

FIELD OF THE INVENTION

This invention relates to radar, and more particularly to ground-based monopulse approach radar using array antennas.

BACKGROUND OF THE INVENTION

A major problem with ground-based radar systems has always been ground clutter. "Ground clutter" refers to radar reflections from structures located close to the radar transmitter-receiver, which are strong relative to ordinary or desired targets (generally aircraft or other vehicles) because of the short path lengths between the transmitter-receiver and the clutter. In many cases, the clutter arises from immobile objects, and simple discrimination against non-moving targets suffices to ameliorate the clutter problem. Such discrimination is provided by "moving target indication," which discriminates in favor of target signals which change as a function of time. It has been found, however, that even immobile objects can have some motion, as for example the movement of the leaves of trees has been known to occasion clutter, even when a moving target discriminator is used.

When a radar system is operated adjacent to a reflective surface such as the Earth or a sea, target signals arrive at the receiving antenna directly from the target, and also arrive in the form of reflections from the reflective surface. Since the arriving signals originated from or were reflected by the target, both the direct (non-ground-reflected) and ground-reflected signals have the changing electrical parameters characteristic of moving targets, and so moving target discrimination (MTI) is totally ineffective in separating the direct target signal from the ground-reflected target signal. Since the ground-reflected signal arrives at the receiving antenna from an elevation angle which is different from the angle at which the direct target signal arrives, and cannot be discriminated against by moving target indication, the apparent elevation angle of arrival of the composite signal (the sum of the direct target signal and the ground-reflected signal) is different from the elevation angle of arrival of the desired direct target signal alone. Since a major aspect of radar operation is the determination of target direction from the angle at which the target-reflected signal arrives at the receiver, an error in the apparent direction of arrival may be translated into an error in the apparent direction of the target.

In the context of a ground-controlled approach radar or its modern equivalents, the radar returns indicate both the angle of the target relative to the receiving antenna and its range. The range and angle are then processed using simple trigonometric identities to determine the altitude of the target. More generally, the trigonometric identities can be applied to determine the three Cartesian coordinates (e.g., x—downrange, y—cross-range, and z—height) of the target in an arbitrary earth-fixed coordinate system, typically but not necessarily centered on the radar. If the indicated elevation direction is incorrect, the calculated altitude will also be in error. The directional and range information can be important in navigation of the vehicle, and significant errors are undesirable. A method to reduce the effects of ground reflections on terrestrial radar systems is to place a physical wall (i.e., multipath fence) before the radar antenna, of a height insufficient to interfere with a direct path extending between the target and the radar antenna, but sufficiently high to at least partially block some of the target signals which might be reflected from the ground into the radar antenna. Such walls are expensive and inconvenient.

Many radar systems use "monopulse" techniques to aid in determination of the exact angular location of the target relative to two orthogonal axes lying in the plane of the array face. Typically, one axis is parallel to the array's element rows, the other is parallel to the array's element columns, and they intersect at the center of the array. Furthermore, the element rows are horizontal in conventional ground-based radars. In monopulse operation, a conventional single-mainlobe "sum" beam is directed toward the target. The beamwidth of the sum beam is sufficiently large that the target is unlikely to leave the peak region of the beam during ordinary maneuvers over the period of time required by the radar to collect sufficient signal for a monopulse angle estimate. The peak of such a sum beam, however, is relatively broad, and the signal reflected from the target is not particularly sensitive to slight variations of the target within the beam peak. Monopulse systems also make use of simultaneous and collinear "difference" beams in at least one of horizontal and vertical directions to refine the directional information. Generally, this information is in the form of angular magnitudes and senses relative to either one axis or two orthogonal axes lying in the plane of the array face. A difference beam is characterized by a sharp gain null, generally coincident with the beam peak of the sum beam. Furthermore, the phase of the difference beam changes by 180 degrees as the target angle traverses the null, thus allowing the radar to determine the sense of the target's deviation from the monopulse axis or axes as well as the deviation's magnitude. In the case of an array antenna, a difference beam can be generated by subtracting one beam portion from another. One simple way to accomplish this is to subtract the signals produced by two different and non-collinear beams of the array. More particularly, a very simple way to produce a difference beam is to take the difference between the target signals produced by two halves of the array operated independently of each other. An antenna including an array of antenna elements organized into rows and columns can be divided horizontally into two halves, and vertically into two halves, to thereby define four quarter-array sections. All four of the quarter-array sections are operated in a sum mode to generate the sum monopulse beam, the two upper quarter-array sections are summed and this sum operated in difference with the sum of the two lower quarter-array sections to produce the elevation difference beam, and the two right quarter-sections are summed and operated in difference with the sum of the two left quarter-sections to produce the azimuth difference beam. The two difference beam signals, when divided by the sum beam signal to eliminate the influence of absolute target signal magnitude, then give an accurate indication of the actual angular position of the target relative to the two previously discussed orthogonal axes.

One of the characteristics of antennas is that, in general, for antenna apertures (which may be viewed as the size relative to the wavelength) larger than a few wavelengths, the beamwidth (the angular width of the central high gain lobe) is inversely related to the aperture width. The sidelobe level, however, is related not to the aperture width but rather to the amplitude weighting applied across the aperture. For example, regardless of the size of the aperture, the peak sidelobe gain will always be 13 dB below the peak mainlobe gain if the aperture is linearly weighted. In order to reduce the peak sidelobe level, an amplitude taper such as Taylor weighting is applied across the aperture. This bell-curve-shaped taper emphasizes the contribution of signals incident near the center of the aperture and smoothly decreases the emphasis toward the edges of the aperture. As noted above, this sidelobe level control can be applied and any reasonable sidelobe level achieved independent of aperture width, as long as this width is greater than a few wavelengths. This latter condition almost always applies in radar applications. Typically, Taylor weights are applied to the array antenna aperture to produce a sum beam while Bayliss weights are simultaneously applied to produce difference beams. Bayliss weights are similar to Taylor weights because they allow a sidelobe level to be specified, but they produce a difference beam that has the requisite gain null in the center. The resulting difference beam also has the requisite 180-degree phase change as the target angle traverses the null. When an array antenna is operated in a monopulse mode, the operation may be accomplished, in part, by division of the array into quarters. In the cases of the both the sum and difference beams, the beams are formed by coherently combining the four array quarters, but in different ways, essentially with different weight tapers. As a result, the sum beam and two difference beams are based on exactly the same size antenna apertures. When the sum of the upper two aperture quarters is subtracted from the sum of the lower two aperture quarters, an elevation angle difference beam is produced, but one that has extremely high sidelobes in a vertical plane through the center of the beam. These sidelobes are so high that it may not be clear where the difference beam mainlobes end and the sidelobe region begins. The sidelobes of this difference beam are high not because of the effective aperture size relative to the sum beam, but because the subtraction process produces an effective weighting across the vertical aperture that differs greatly from optimal Bayliss weighting. The subtraction process results in a large weight discontinuity between the two elements that straddle the center of the aperture and it is this weight discontinuity that produces the high sidelobes. Bayliss weights eliminate this discontinuity by tapering the signal emphasis not only toward the edges of the aperture as in the case of Taylor weights, but also toward the center of the aperture. Unfortunately, the simultaneous implementation of Taylor weights for the sum beam and Bayliss weights for the difference beams is expensive and results in a very complicated antenna feed structure. Low-cost radars avoid the use of Bayliss weights by simply subtracting one half of a Taylor-weighted aperture from the other. But they must then accept the high difference beam sidelobes that result. Sometimes these high difference beam sidelobes are not a problem, as in the case of an airborne radar, but when the radar is operated close to a reflecting surface they may result in severe multipath interference. Due to these high sidelobes, the elevation difference beam has relatively high gain in the direction of the undesired multipath signal. The net direct-path plus multipath target signal received by the difference beam may then differ significantly from the signal that would be received through an ideal low-sidelobe difference beam. As a result, the target elevation angle estimate derived from the perturbed difference beam signal may be severely errored.

Improved radar multipath rejection is desired.

SUMMARY OF THE INVENTION

In general, the invention allows the radar to form its elevation difference beam by means of the inexpensive subtraction method rather than a more optimal weighting method, and mitigates the effects of the resulting high sidelobes so that the radar can be operated in close proximity to the ground.

More particularly, a land-based approach radar arrangement according to an aspect of the invention comprises an array antenna for at least receiving target signals. The array antenna comprises a plurality of antenna elements arranged in an array of rows and columns. In a preferred embodiment, the array defines a planar array. A beamforming arrangement is coupled to the plurality of antenna elements, for controlling at least one electrical parameter of signals traversing the antenna elements, for forming at least a sum beam generally orthogonal to the array plane, and for forming an elevation difference beam, also generally orthogonal to the array plane. An array antenna mounting arrangement mounts the array of antenna elements with both the rows and the columns skewed in angle such that neither the rows nor columns are parallel to a horizontal plane. An angle determining arrangement is coupled to the beamforming means for converting a measured target angle in the antenna coordinates to an estimated target position in horizontal and vertical coordinates. In one version of this embodiment, the array may be oriented such that the element rows are skewed in angle relative to horizontal. The skewed array is then tilted back from a vertical orientation to position the beams at a desired elevation angle, with the tiltback angle typically between 3 degrees and 12 degrees but possibly as high as 45 degrees. The preferred overall shape of the array is rectangular, and the most preferred is square. The preferred angle of skew of the rows and columns is related to the ratio of the column height to row width. For a square array, the angle of skew of the rows and columns relative to the horizontal is preferably 45°. Vertices of the rectangle or square may be removed.

In another version of an embodiment of the invention using monopulse techniques, the array of antenna elements is divided about one of the rows and columns into substantially equal-number first and second portions, and the beamformer arrangement forms the elevation difference beam by taking the difference between signals received by the first and second portions of the array of antenna elements.

BRIEF DESCRIPTION OF THE DRAWINGS

FIG. 3a plots actual and estimated height of a simulated target using an antenna such as that of FIG. 2, and FIG. 3b plots the difference or altitude error illustrated in FIG. 3a;

FIG. 6a plots against range the actual target altitude and estimated altitude for a monopulse radar receiver using the antenna/beamformer of FIG. 5, and FIG. 6b plots the difference or altitude error illustrated in FIG. 6a;

DESCRIPTION OF THE INVENTION

Figure 1A:
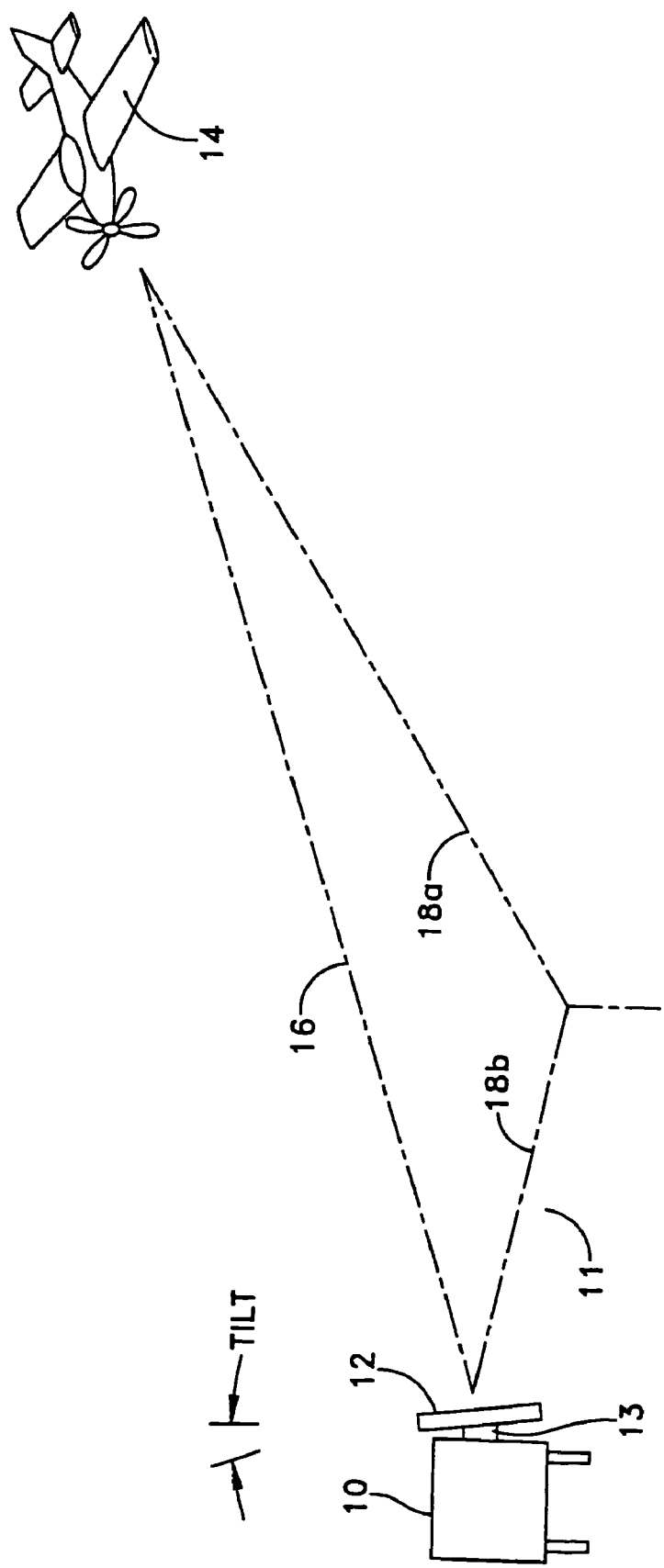
FIG. 1a is a simplified diagram illustrating a ground-based precision approach radar system and a target, and also illustrating a direct signal path and a ground-reflected multipath signal path extending from the target to the radar antenna.

In FIG. 1a, a precision ground approach radar is mounted in a trailer 10. One of the radar antennas is illustrated as a fixed planar array antenna 12 mounted by a mounting 13 to the side of trailer 10 at a location somewhat above ground level 11, and tilted back from vertical by a tiltback angle to direct the broadside of the antenna plane toward the expected elevation angle of the target. A distant target is illustrated as an aircraft 14. A direct path extending between the target 14 and the antenna 12 is illustrated as a straight dash-double-dot line 16. In principle, radar signals transmitted from antenna 12 traverse path 16 to arrive at the aircraft or target 14, and some of the signals reflected by the target 14 traverse path 16 in the opposite direction to thereby provide an indication of the presence and location of the target. In addition to the direct path 16, a radar system such as that of FIG. 1a which has its antenna mounted above ground also receives signals reflected from the target by a reflective path illustrated as a two-part dash line 18a, 18b. A specular (mirror-like) reflection occurs at a location 20. This location is an advantageous one at which a ground reflection prevention wall could be located, as the wall would not have to be very high to prevent the reflections. The location of this specular reflection point is such that the angle subtended by lines 18b and 11 is equal to the angle subtended by lines 18a and 11. This location is a function of radar height, target height, and target range. The location of the specular reflection point and its elevation angle relative to the radar therefore change as the target moves along the glide slope.

Figure 1B:
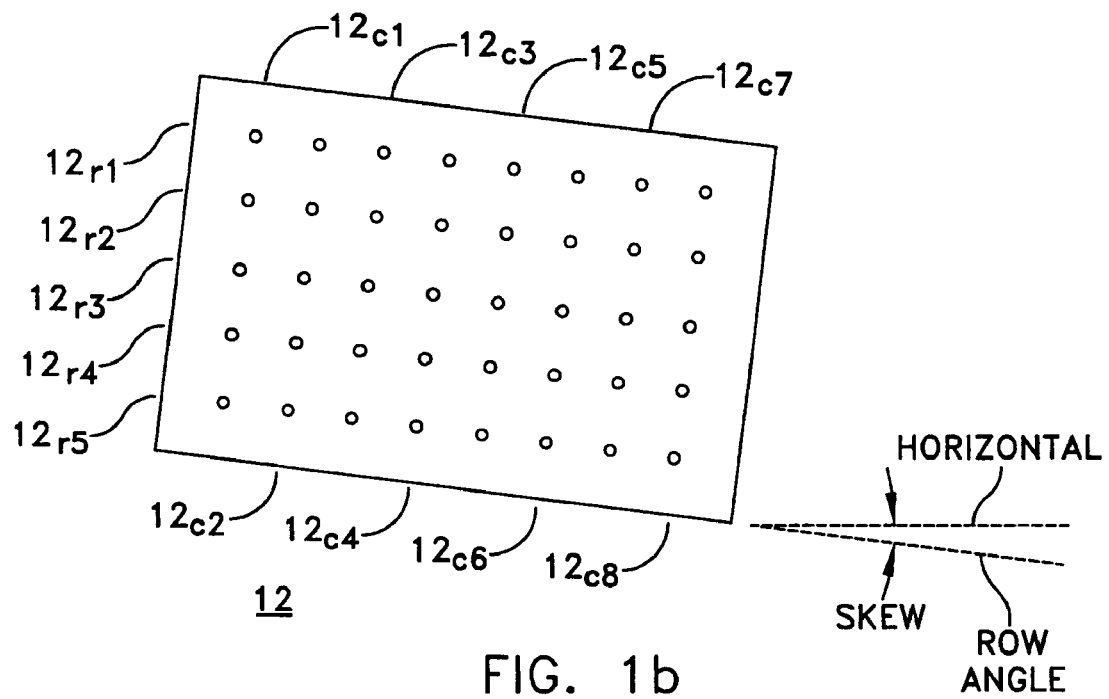
FIG. 1b is a simplified frontal or elevation view of a planar array antenna which may be used in the arrangement of FIG. 1a, showing rows and columns of the array, and defining the skew angle of the array.
Figure 1C:
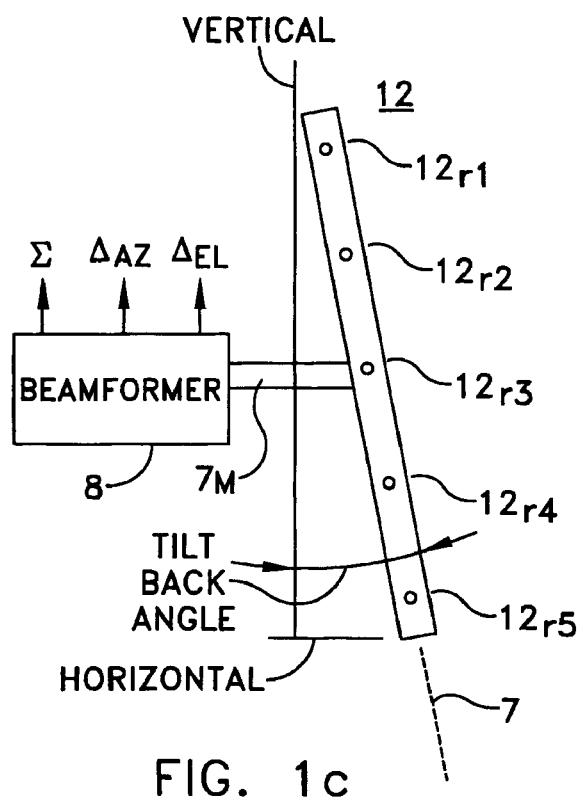
FIG. 1c is a simplified side elevation view of the arrangement of FIG. 1, showing the effect on the rows and columns of tiltback of the antenna of FIG. 1b.

FIG. 1b illustrates one possible configuration of an array antenna which may be used for antenna 12 of FIG. 1a. In FIG. 1b, the array antenna 12 includes a plurality of antenna elements, illustrated as dots or circles, one of which is designated as 6, all arranged with five rows $12r_1$, $12r_2$, $12r_3$, $12r_4$, and $12r_5$ lying one over the other in a vertical direction, and with eight columns $12c_1$, $12c_2$, $12c_3$, $12c_4$, $12c_5$, $12c_6$, $12c_7$, and $12c_8$ arrayed horizontally. Those skilled in the art know that the configuration or outline of an antenna array may be rectangular, square, circular, elliptical, or have any other shape, including irregular shapes, so long as the aperture or antenna characteristics in the principal planes are suitable. FIG. 1c is a side elevation view of the arrangement of FIG. 1b, illustrating the effect of tilting the plane of the array back from vertical. It will be understood that the columns are tilted at the tiltback angle. If the skew angle illustrated in FIG. 1b were 0°, the rows illustrated in FIG. 1c would not be tilted, but rather would remain parallel to a horizontal plane, as seen in the end view of the rows in FIG. 1c. In the presence of a finite skew angle, the rows would no longer be parallel to a horizontal plane because they would be skewed relative to the horizontal plane by approximately the skew angle shown in FIG. 1b. The rows will deviate from the horizontal plane by an angle approximately, but not exactly, equal to FIG. 1b's skew angle. The reason is that the tiltback angle couples in to produce an angle that deviates slightly from the skew angle. However, if the tiltback is small, as it usually is, the rows will deviate from horizontal by an angle that is almost equal to the skew angle. FIG. 1c also illustrates a beamformer 8 which is coupled to the array antenna 12 in known fashion, for combining antenna elements for generating sum (Σ), azimuth difference (Δ−Az) and elevation difference (ΔEl) beams.

Figure 2:
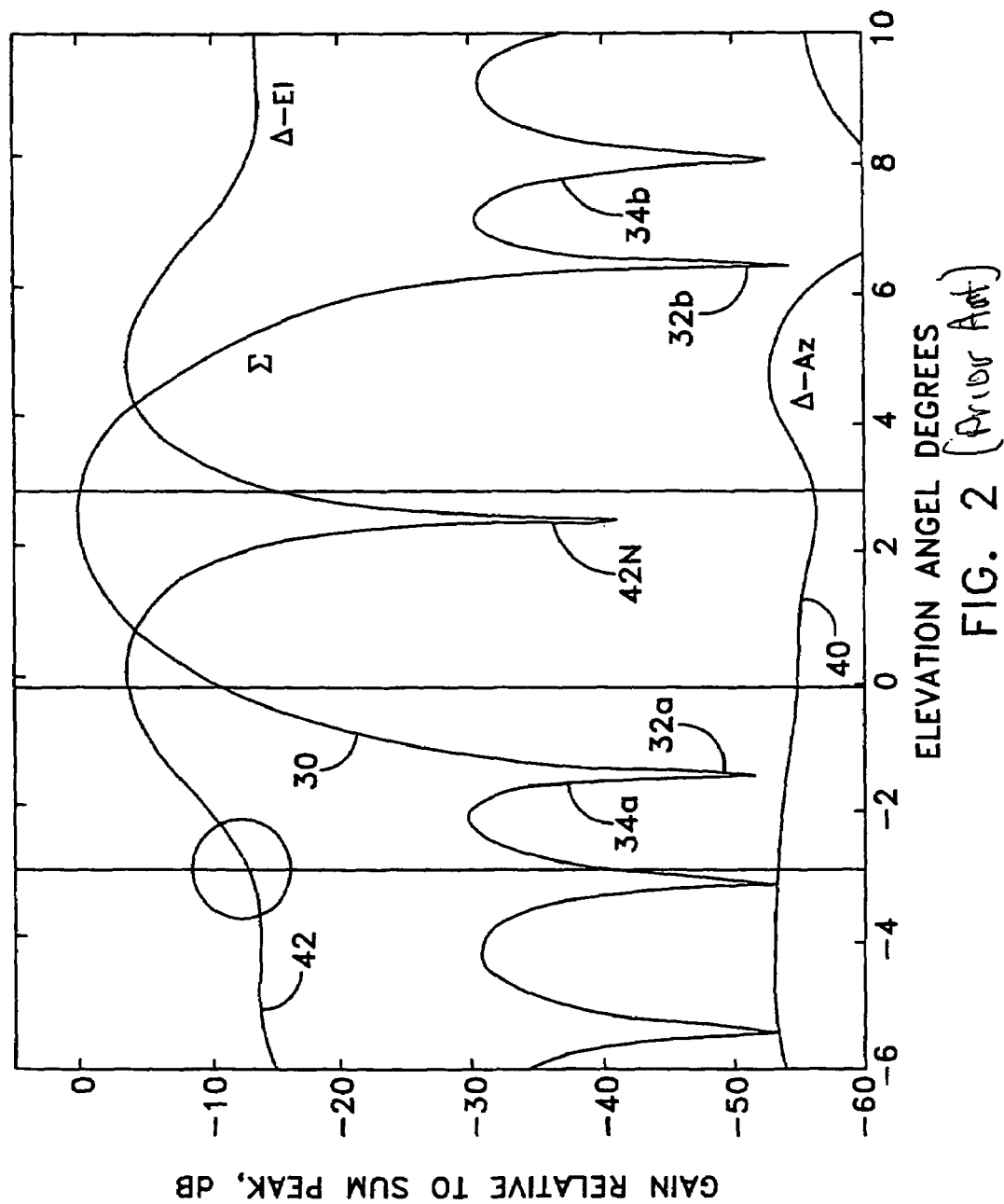
FIG. 2 illustrates plots of a prior-art array antenna with a beamformer for monopulse operation which may be used in the system of FIG. 1a, showing a high sidelobe level in the elevation plane.

FIG. 2 represents the sum and difference beam gains seen by target and multipath in the prior art. More particularly, FIG. 2 illustrates plots of conventional monopulse antenna radiation patterns associated with a target at a range of 15 nautical miles (nm) and at an azimuth angle of 0° and an antenna whose rows are horizontal. The radar in this example has a 0 degree skew angle, a 2.5 degree tiltback angle, and the center of the antenna is five feet above a surface with the electrical characteristics of cured concrete. The antenna aperture is Taylor-weighted to form a sum beam with 30 dB sidelobes. The elevation difference beam is formed by subtracting the signal received by the upper half of the Taylor-weighted aperture from the signal received by the lower half of the Taylor-weighted aperture. In FIG. 2, antenna gain is plotted as a function of elevation angle. The direct path (16 of FIG. 1a) for a target aircraft on a conventional 3 degree glidepath varies from the position of the rightmost vertical line at approximately 3 degrees to the position of the central vertical line at approximately 0 degrees as the aircraft flies in from 15 nautical miles to touchdown 2000 feet from the radar. Zero elevation angle (0°) in FIG. 2 corresponds to the horizontal, and negative (−) elevation angles correspond to depression angles relative to the antenna, such as the angle at which ground-reflections (18b of FIG. 1a) arrive at the antenna. The main or sum (Σ) beam 30 of FIG. 2 defines a broad main lobe whose peak is at 2.5 degrees, corresponding to the tiltback angle of the antenna of FIG. 1a. The sidelobes of this sum beam (34a and 34b of FIG. 2) are very low by design, approximately 30 dB, and are the result of a Taylor weight amplitude taper applied across the array face by the array's RF feed network. The beamwidth of the main portion of the sum beam 30, measured between the closest-in nulls 32a, 32b (between the main beam and the first sidelobes 34a, 34b) is about 8°. In FIG. 2, the elevation difference beam (Δ−El) is designated 42, the null in the elevation difference beam at 2½ degrees is designated 42N, and the azimuth difference beam (Δ−Az) is designated 40. Note that the elevation difference beam 42 has no discernible transition between its mainlobe region and the sidelobe region, and gain is relatively high regardless of signal elevation angle. In this particular example, the signal azimuth of the azimuth difference beam 40 relative to the array is exactly zero. The azimuth difference beam gain therefore is irrelevant because both the direct path and multipath signals are incident upon this beam's null. The low gain that is seen in the plot 40 is due entirely to array errors. Ideally, this gain would be minus infinity dB. The rightmost vertical line in this plot represents the elevation angle of a target at 15 nautical mile range on a 3 degree glide slope that intersects the ground 2000 feet in front of the radar. As the target moves along the glide slope toward touchdown, its elevation angle moves from the rightmost vertical line to the center vertical line that represents the elevation angle of the touchdown point. Similarly, the leftmost vertical line represents the elevation angle of the multipath signal when the target is at 15 nautical mile range. This angle also moves toward the central vertical line as the target moves toward touchdown. At touchdown, the direct path signal and the multipath signal have exactly the same elevation angle, i.e., the angle represented by the central vertical line. A key point here is that as the multipath signal moves from the leftmost vertical line to the central vertical line it enters the elevation difference beam with high gain. Because this gain is comparable in magnitude to the difference beam gain seen by the direct path signal, the multipath signal represents a large difference beam error and the result is a badly corrupted estimate of the target's elevation angle.

Also in FIG. 2, the response of the azimuth difference beam ($\Delta$–Az) 40 can be seen to be a maximum of about −53 dB, and is even less, perhaps about −55 dB, at elevation angles corresponding to approaching aircraft. As mentioned, the ideal gain of the $\Delta$–Az beam is zero, or minus infinite dB. The finite response illustrated in FIG. 2 is primarily due to unavoidable array element-to-element errors. The exact magnitude of the response will vary randomly as a function of random unavoidable array element-to-element amplitude and phase errors. Other simulation runs might give different numbers.

In addition, FIG. 2 illustrates the elevation difference monopulse beam ($\Delta$–El) 42 as having a sharp null 42N, of a depth of about 37 dB (relative to the peak $\Delta$–El beam) at an elevation angle coincident with the peak of the sum beam. The finite null depth is due to the same array errors that produce a finite azimuth difference beam response at 0 degrees azimuth. Again, the exact null depth is a function of random array errors, and it may be better to simply characterize the depth as "deep." At depression angles of about −3°, corresponding to the multipath elevation angle when the aircraft is at the onset of the glide path at 15 nautical mile range, the elevation difference beam $\Delta$–El has a response which is only about −12 dB relative to the peak of the $\Sigma$ beam. This indicates that signals arriving at the antenna 12 of FIG. 1a by the ground-reflected path 18b are responded to more strongly than signals arriving by way of the direct path at approximately 3 degrees elevation. As mentioned, the ground-reflected target signal arriving at antenna 12 of FIG. 1a by way of path 18b can, if not suppressed or distinguished from in some way, adversely affect the indicated location of the target.

Figure 3A:
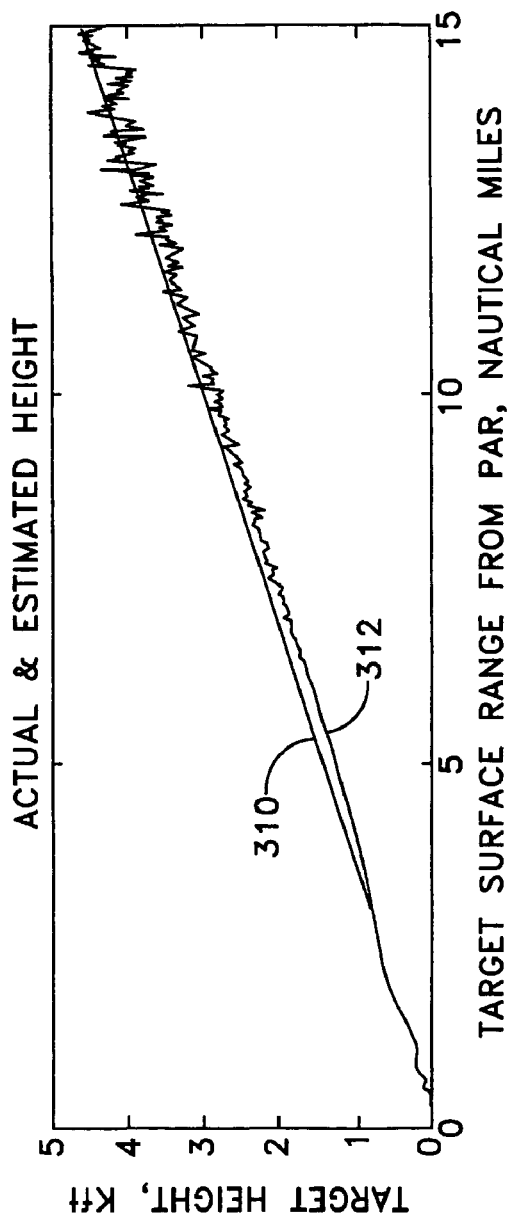
Figure 3B:
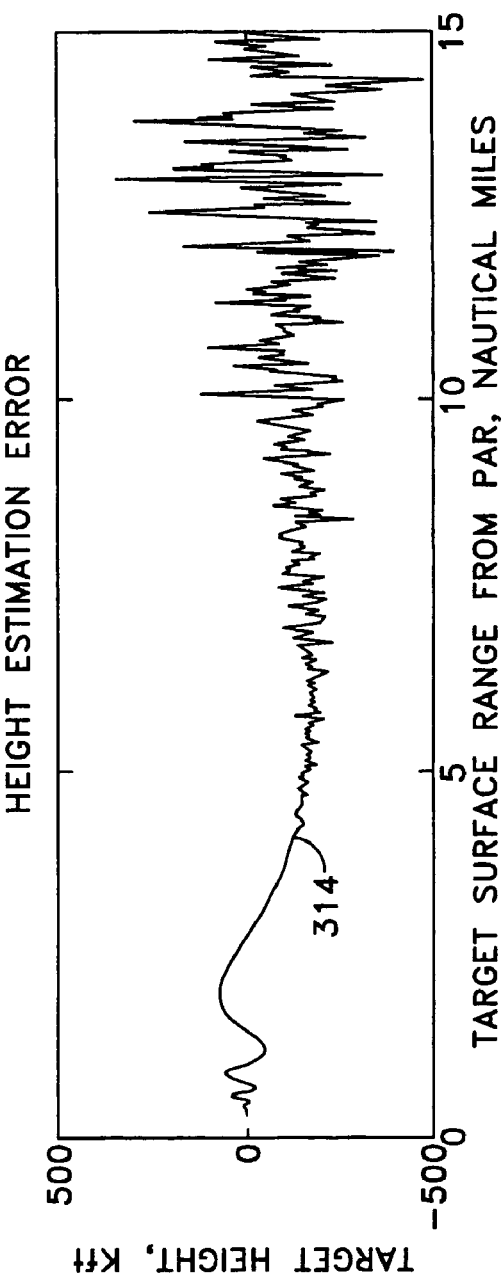

Conventional signal processing is hard put to provide accurate target altitude estimates under these conditions FIG. 3a plots actual and estimated target heights 310 and 312, respectively, as a function of range, based on prior-art processing and monopulse antennas having characteristics such as those described in conjunction with FIG. 2. FIG. 3b presents as plot 314 the difference between plots 310 and 312 of FIG. 3a. This difference is the error in the altitude estimate. The target scenario in the case of FIGS. 3a and 3b is the same as that described previously for FIG. 2. In FIG. 3a, the straight line 310 represents the target's true height as it flies along the glide slope and the other line 312 represents the height estimated from range measurements and multipath-corrupted elevation angle measurements. The smooth deviations from ideal are due to multipath while the rapid noise-like deviations are due to thermal noise. Significant multipath-induced height error exists along the entire flight path from 15 nautical mile range to touchdown. As can be seen from FIG. 3b, the target altitude estimates deviate by as much as about +300 feet and −450 feet from the actual altitude at those ranges having maximum error. It is thought that these two errors are primarily due to weak signal strength and thermal noise error near maximum range, and not multipath. Multipath errors are present, but at the longer ranges they are obscured by the presence of the thermal noise errors. At shorter ranges, however, where the signal strength is high, the multipath errors dominate. The errors produced by multipath are the ones that vary smoothly or appear to be a bias. Thus, the substantial systematic error at ranges of less than about 3 nm is attributable to the effects of multipath. A systematic error or bias toward indication of too low an altitude occurs in the range of about 3 to 13 nautical miles.

Figure 4:
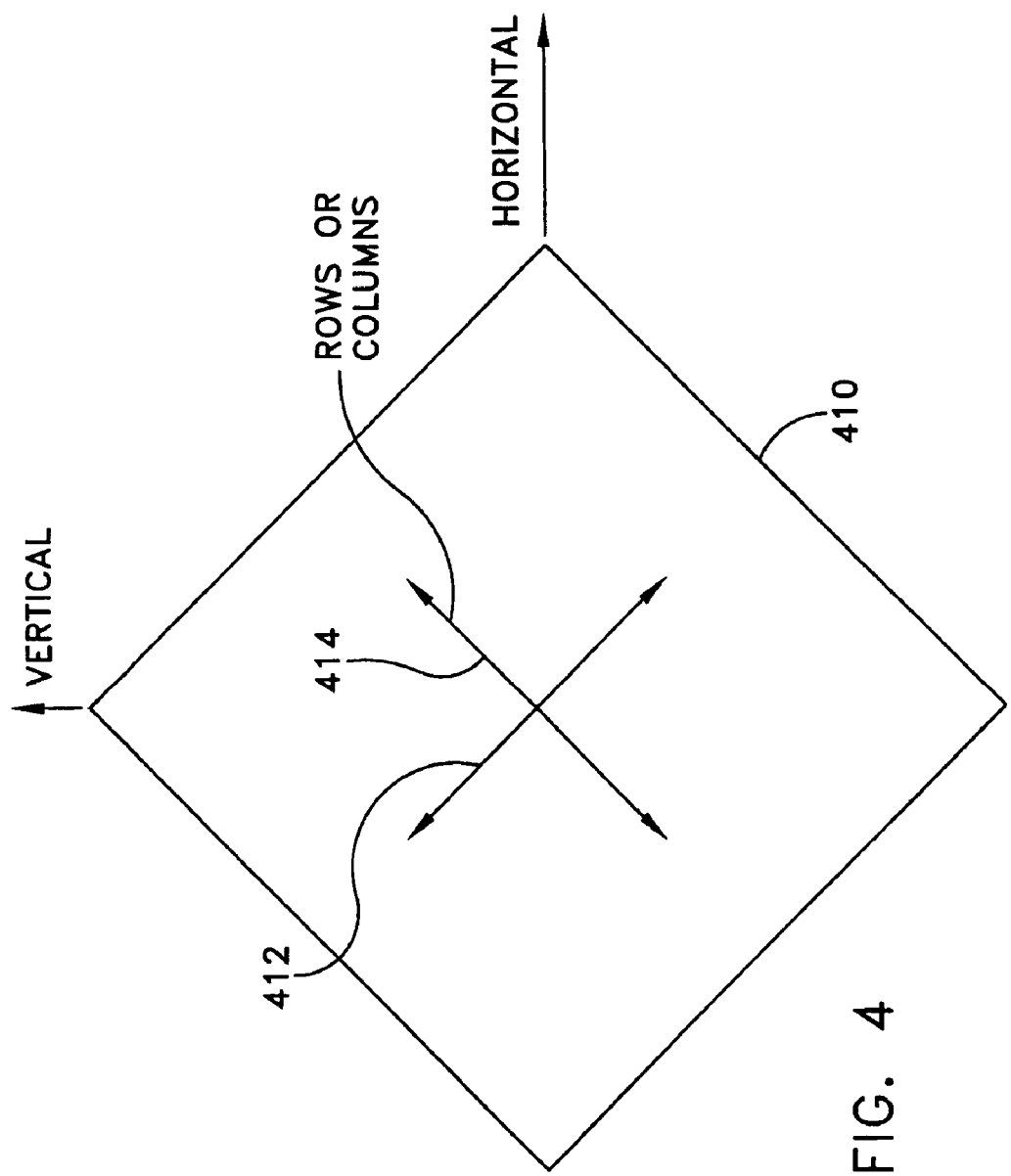
FIG. 4 illustrates a skewed mounting of the rows and columns of an array antenna which can be used with a beamformer according to an aspect of the invention to produce monopulse sum and difference beams which have reduced sidelobe levels in the elevation plane.

It has been discovered that the elevation difference beam has radiation patterns which vary as a function of the angle at which the antenna (12 of FIG. 1a) is measured or viewed. More particularly, the elevation difference beam has different sidelobe characteristics when the rows and columns of the antenna are both skewed relative to the horizontal, compared with the situation when either the rows or columns are horizontal. FIG. 4 illustrates in broadside or elevation view a square antenna array 410 defining rows and columns (not illustrated) extending in the directions indicated as 412 and 414, both of which are skewed relative to the vertical and horizontal. As illustrated, the skew angle of arrows 412 and 414 are about 45°. It will be clear that a slight tilt of the plane of array 410 will not significantly affect the skew of the rows and or columns as seen in FIG. 4.

Figure 5:
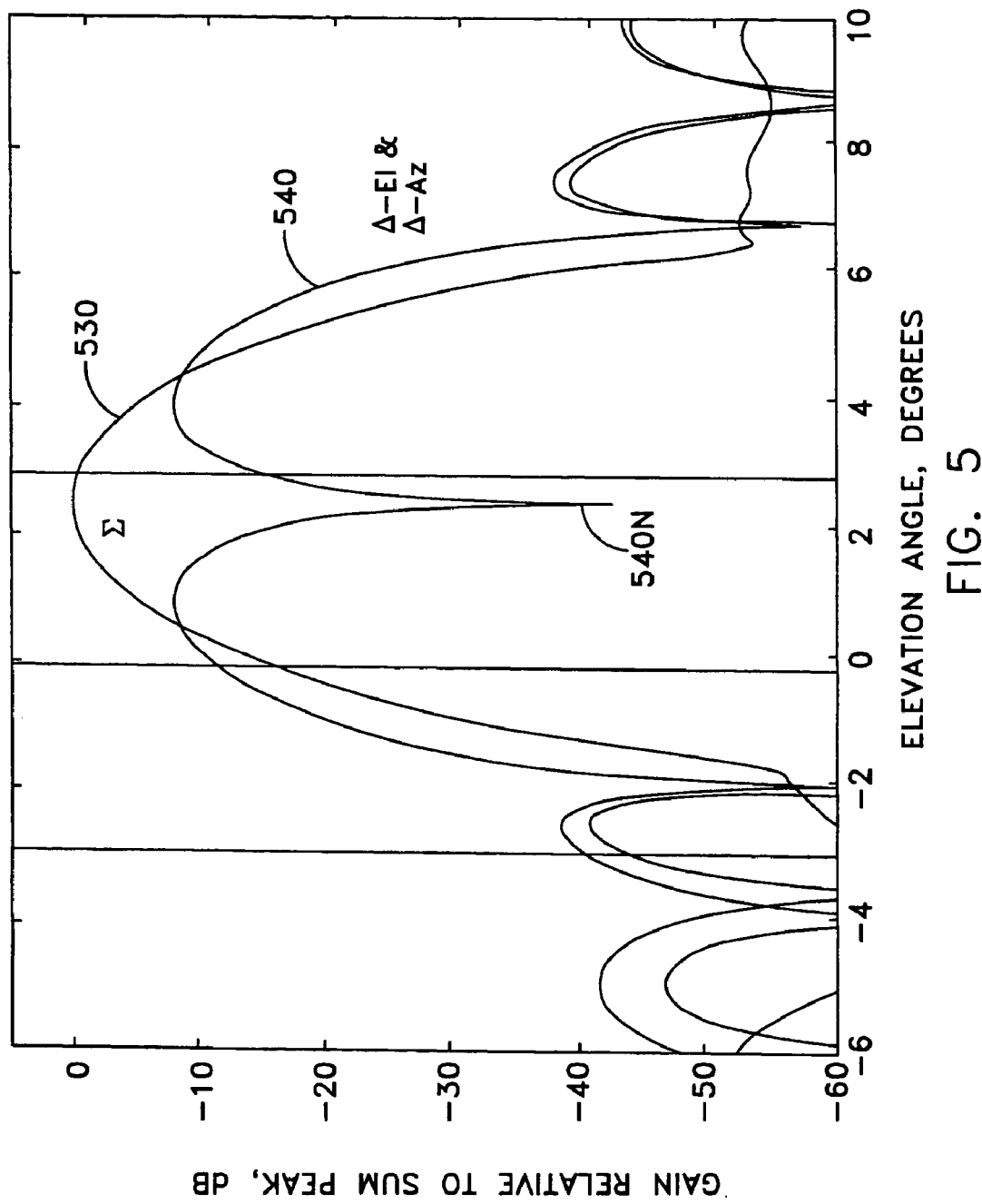
FIG. 5 is a plot of elevation gains for the skewed antenna of FIG. 4 which is used with its beamformer to produce monopulse sum and difference beams having elevation sidelobes for the elevation difference beam which are reduced in amplitude relative to those of FIG. 2.

The mounting of the array antenna 410 of FIG. 4 at a skew angle has the effect of changing the effective sidelobe levels as measured in the elevation plane at azimuth angle 0°. FIG. 5 illustrates $\Sigma$, $\Delta$Az, and $\Delta$–El beams for the skewed arrangement of FIG. 4. In the arrangement of FIG. 5, the array rows and columns are skewed 45 degrees relative to horizontal as shown in FIG. 4. Because the array is square and skewed 45 degrees, the elevation difference beam gain versus elevation angle profile and the azimuth difference beam gain versus angle profile are identical and indistinguishable in the plot. Also in FIG. 5, as the multipath signal moves from the leftmost vertical line to the central vertical line it enters the difference beams at significantly lower gain than in the case of FIG. 2. Therefore, over most of the target's flight, the monopulse angle estimates are relatively multipath-free and the corresponding height estimates are relatively accurate compared to the original case where the array is not skewed. Near touchdown, however, the multipath signal enters the difference beam mainlobe and the resulting monopulse angle estimation error increases. This near-touchdown error is unavoidable, however, because the direct path and multipath signals are incident upon the radar from essentially the same elevation angle. Only an enormous vertical antenna aperture with its corresponding narrow elevation beamwidth can mitigate this residual multipath error near touchdown. This near-touchdown error is not addressed by the invention. The invention, however, does reduce the multipath-induced error over most of the flight path compared to a similar radar not using the invention. The sum ($\Sigma$) beam 530 of FIG. 5 is generally similar to that of $\Sigma$ beam 30 of FIG. 2. The azimuth and elevation difference ($\Delta$) beams, however, are quite different from those illustrated in FIG. 2. The first difference which is apparent on the face of FIG. 5 is that both the azimuth and elevation difference ($\Delta$) beams have the same shape, designated 540. This is to be expected, since the two beam patterns are now symmetrical relative to the vertical plane in which the array pattern measurement is made. In addition, both the azimuth and elevation difference beams exhibit an on-axis null 540N. The most significant difference for the purposes of the invention lies in the amplitude of the off-axis elevation difference beam. Instead of the amplitude at a −3° depression angle being about −12 dB as in FIG. 2, the skewing of the row and column axes results in a much lower level, illustrated as being at about −40 dB. This represents a relative reduction or rejection of ground-reflected power of almost 1000:1. Such a large improvement in the response of the antenna/beamformer may be more significant than the effect of a ground-reflection wall placed before the antenna.

The mounting of array antenna 410 at a skew angle relative to the horizontal has the effect of moving the azimuth and elevation nulls of the Δ beams into skew planes corresponding to planes orthogonal to the antenna plane of FIG. 4 and including the arrows 412 and 414. This means that the relatively simple relations that are ordinarily used to derive angle relative to boresight from the difference beams must be modified. Put another way, the target location as indicated by the Δ beams must be converted from the "rotated" antenna coordinates to horizontal and vertical. This type of conversion is mentioned in U.S. Pat. No. 3,719,949, issued Mar. 6, 1973 in the name of Hemmi, in the context of an aircraft where the roll is variable. In general, the conversion is accomplished as follows.

First, the two monopulse measurements, cast in terms of direction cosines relative to the axes of a coordinate system aligned with the array's rows and columns and referred to as u and v, are placed in the first two element positions of a 3×1 direction cosine vector. This is in accordance with the general monopulse technique of directly measuring the direction cosines of a vector that points from the antenna to the target. Direction cosines, not angles, are the natural units for all array computations. The third direction cosine of this vector is computed as the square root of $1-u^2-v^2$ and is equal to the sine of the received signal's angular deviation from array normal. This direction cosine vector represents the measured direction cosines of the target in an array-face coordinate system and in general requires six separate angular rotations to map it into the reference earth-fixed coordinate system in which azimuth and elevation are defined. The six angles by which the direction cosine vector must be rotated are the antenna's three orientation angles relative to the platform upon which it is mounted (including its tiltback and skew angles) and the three orientation angles of this platform relative to the reference earth-fixed coordinate system.

Second, six 3×3 coordinate rotation matrices are computed, one for each of the required rotation angles.

Third, these six matrices are multiplied together in the appropriate order to form a net 3×3 coordinate rotation matrix that includes the effects of all six angles.

Fourth, the matrix product of the net 3×3 coordinate transformation matrix and the original 3×1 direction cosine vector is formed and the result is a new 3×1 direction cosine vector. This new vector contains the direction cosines of the target's direction relative to the reference earth-fixed coordinate system and the one in which azimuth (relative to north) and elevation (relative to horizontal) are defined.

True target azimuth is computed as the inverse tangent of the ratio of the first and third transformed direction cosines and true target elevation is computed as the inverse sine of the second transformed direction cosine. Furthermore, the target's estimated height is simply estimated as the product of the target's measured range and the second transformed direction cosine.

The above explanation references six rotation angles, but an arbitrary number can be accommodated if necessary by including the appropriate transformation matrix in the product representing the net 3×3 coordinate transformation matrix. For example, if the antenna's mounting platform were mounted on a vehicle pointed in an arbitrary direction and with unbalanced tire pressures, three more rotation angles would be required. The limiting factor is the ability to measure the various angles. Those that can be measured are included in the computations while those that cannot be measured are kept small by design and then ignored. Their effects then represent angular errors that must be accounted for in the radar system's angular error budget.

Figure 6A:
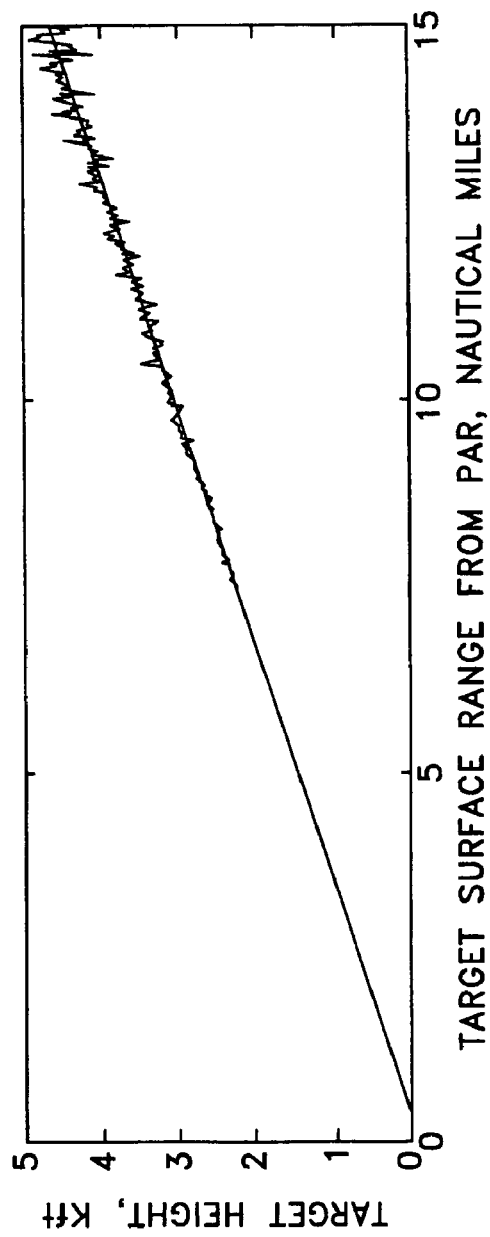
Figure 6B:
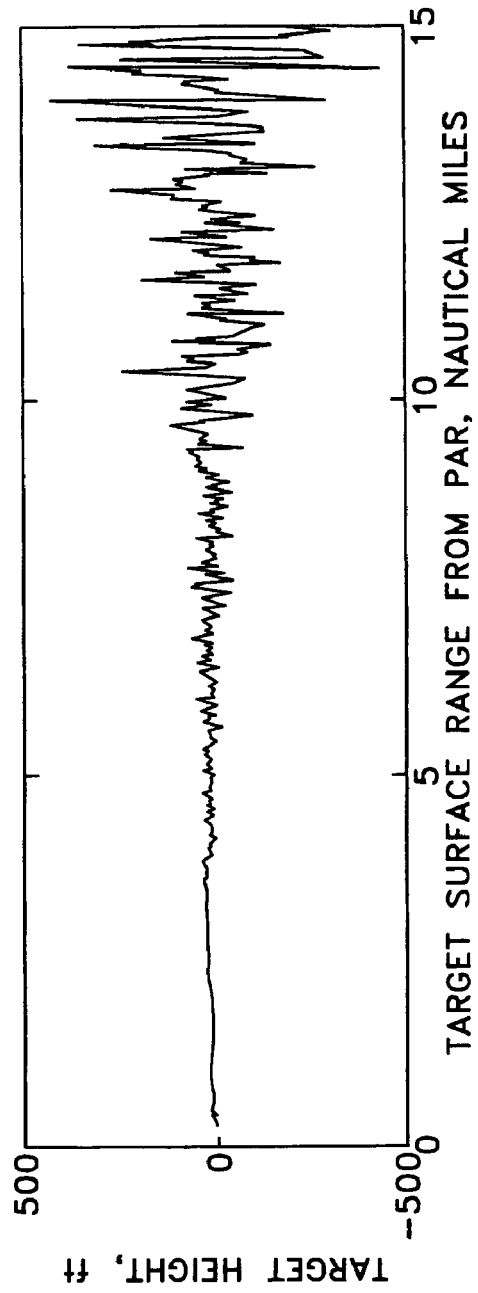

FIGS. 6a and 6b illustrate the actual and calculated target altitude or height for ranges up to 15 nm using an antenna skewed at about 45° as described in conjunction with FIG. 4, with transformation of the coordinate axes from the antenna axes to ordinary horizontal and vertical axes. Simple comparison of FIG. 6a with FIG. 3a shows that the errors remain small out to a much greater range. FIG. 6b is a plot of the difference between the actual altitude and the calculated altitude of FIG. 6a. Comparison of FIG. 6b with FIG. 6b shows that the near-in altitude error is much reduced by the invention, and the systematic error is essentially eliminated at all ranges. These results correspond to the results of FIG. 3 but show that skewing the array face by 45 degrees causes a significant decrease in multipath-induced height estimation error relative to the original array. Thermal noise error remains at long range but this is a signal-strength issue, not a multipath issue. Some residual multipath error does remain near the touchdown point as discussed previously, but this error is unavoidable.

Figure 7:
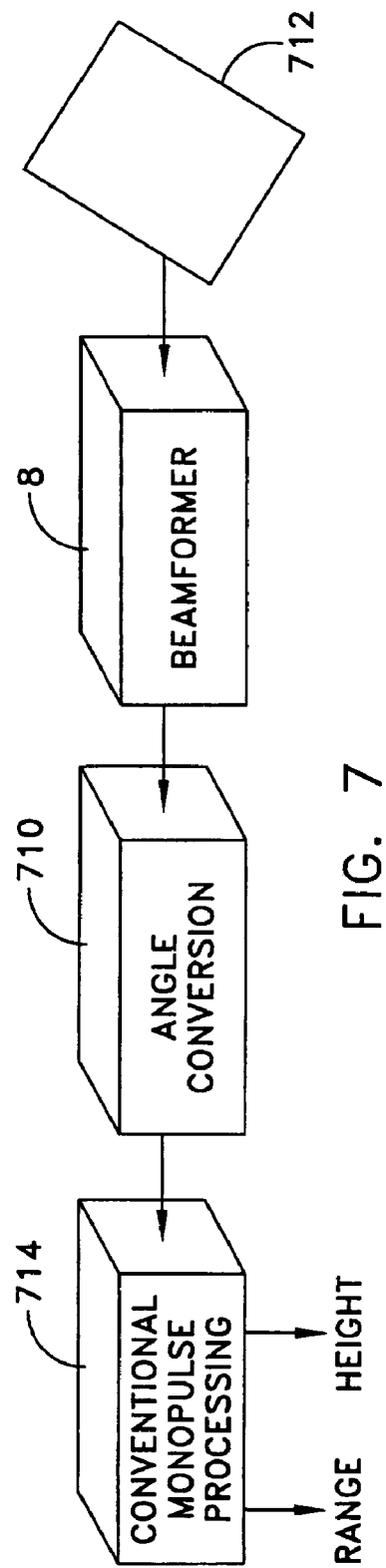
FIG. 7 is a simplified block diagram of a radar system according to an aspect of the invention.

FIG. 7 is a simplified block diagram of a portion of a radar system incorporating the invention. In FIG. 7, the array antenna with rows and columns skewed relative to the horizontal is illustrated as 712. A conventional beamformer 8 is coupled to the array antenna 712 to form the sum and difference beams in the coordinates of the antenna. The resulting information relating to the location of the target in antenna coordinates flows to a block 710, which represents conversion from the antenna coordinates to ordinary horizontal and vertical coordinates. Finally, conventional monopulse signal processing derives the range and estimated altitude of the target.

Figure 8:
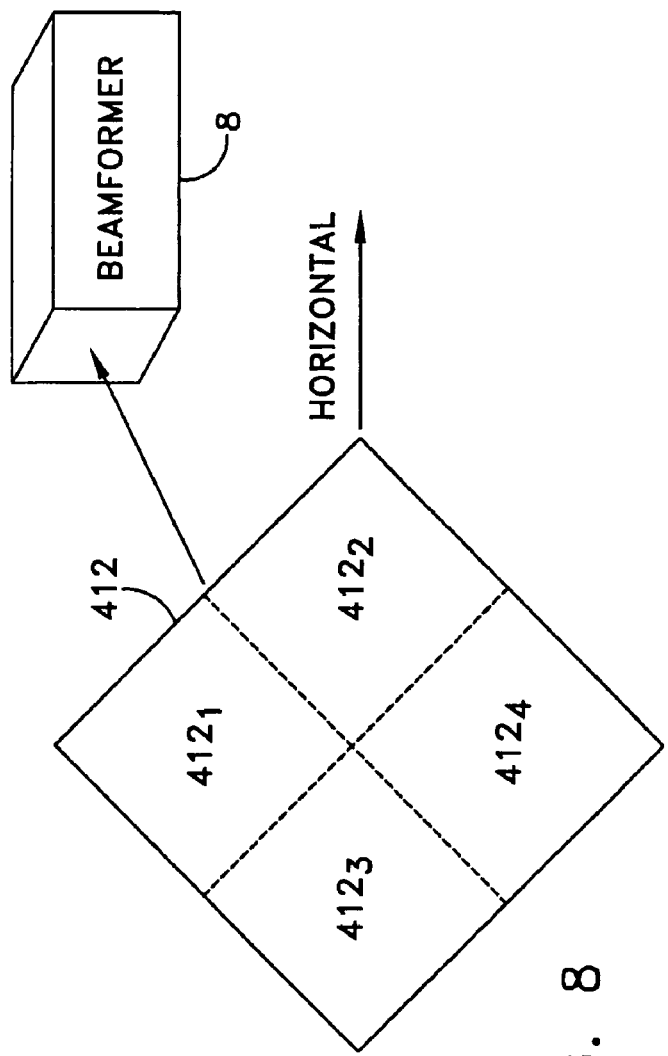
FIG. 8 is a simplified representation of portions of a rectangular array antenna that can be used to generate sum and difference beams.

FIG. 8 is a simplified illustration of an array antenna 412 divided along "horizontal" and "vertical" axes (in antenna coordinates) into four regions 412₁, 412₂, 412₃, and 412₄. These two axes are often referred to as the "E-plane" and the "H-plane". It's often less confusing to use these two designations since it eliminates the need to refer to vertical axes that may not be vertical and horizontal axes that may not be horizontal. Fundamentally, the E and H plane designations refer to the orientations of the electric and magnetic field components relative to the rows and columns of antenna elements. The outputs from the antenna elements in all four regions are added together by the beamformer to form the sum beam in a monopulse system. The outputs from the antenna elements in regions 412₁ and 412₃ are added together, and the outputs from the antenna element in regions 412₂ and 412₄ are added together; these may be considered to be left azimuth and right azimuth beams in antenna coordinates. The sum of the outputs from the antenna elements in regions 412₁ and 412₃ are subtracted from the sum of the outputs from the antenna elements in regions 412₂ and 412₄ to form what can be considered to be the difference azimuth beam in antenna coordinates. Similarly, the outputs from the antenna elements in regions 412₁ and 412₂ are added together, and the outputs from the antenna element in regions 412₃ and 412₄ are added together; these may be considered to be upper elevation and lower elevation beams in antenna coordinates. The sum of the outputs from the antenna elements in regions 412₁ and 412₂ are subtracted from the sum of the outputs from the antenna elements in regions 412₃ and 412₄ to form what can be considered to be the difference elevation beam in antenna coordinates.

Other embodiments of the invention will be apparent to those skilled in the art. The apparent overall shape of the array antenna may be round, oval or ovoid, as a result of the removal of the vertices of the rectangular array, but the invention works best with a perfectly rectangular array and is tolerant of some corner cutting. Extreme shaping of the array aperture, however, may or may not produce beam shapes that are incompatible with the invention. The elements of the array must, however, be arranged in orthogonal rows and columns, so that the array produces "product-pattern beams". These beams are characterized by two orthogonal and narrow ridges of relatively high sidelobes that radiate outward from the mainlobe and very low sidelobes everywhere else, i.e., "off-axis". The invention relies on these very low "off-axis" sidelobes because the array skew essentially moves the multipath signal from the sidelobe ridge into the very low "off-axis" region. If there is no distinction between the "on-axis" and "off-axis" sidelobes, as would be the case with radial or pseudo-random element locations, then the advantages of the invention might not apply. One other point worth mentioning is that the "product-pattern" beams always have the two sidelobe ridges (one in the azimuth direction and one in the elevation direction) and they are usually controlled by Taylor and Bayliss weighting of the aperture. When Bayliss weighting is replaced by split Taylor weights (the case addressed by this invention), however, the elevation sidelobe ridge becomes exceptionally high in the elevation difference beam. Cutting the corners of the array raises the "off-axis" sidelobes to some extent, but these sidelobes still remain low as long as the corner cutting is not excessive. In general, the invention will work best when the array has a perfectly rectangular shape.

Thus, a land-based approach radar arrangement according to an aspect of the invention comprises an array antenna (412) for at least receiving target signals. The array antenna (412) comprises a plurality of antenna elements (6) arranged in an array of rows (12r) and columns (12c). In a preferred embodiment, the array is or defines a planar array. A beamforming arrangement (8) is coupled to the plurality of antenna elements (6), for controlling at least one electrical parameter, such as amplitude or phase, of signals traversing the antenna elements, for forming at least a sum (Σ) beam generally orthogonal to the array plane, and for forming an elevation difference (Δ) beam, also generally orthogonal to the array plane. In the case of rows and columns skewed at a 45° angle relative to the horizontal, there is no particular difference between an elevation difference beam and an azimuth difference beam in the plane of the antenna. An array antenna (412) mounting arrangement (13) mounts the array (12) of antenna elements (6) with both the rows (12r) and the columns (12c) skewed relative to a horizontal plane. An angle determining arrangement (710, 714) is coupled to the beamforming means (8), for converting a target position in the antenna coordinates to a target position in horizontal and vertical coordinates. In one version of this embodiment, the antenna array (412) may be tilted back by as much as 45° relative to the horizontal in addition to having the rows and columns skewed. The angle of skew of the rows and columns is preferably 45° when the overall shape of the array is square. The preferred overall shape of the array is rectangular, and the most preferred is square. Vertices of the rectangle or square may be removed.

In another version of an embodiment of the invention using monopulse techniques, the array (412) of antenna elements is divided about one of the rows and columns into substantially equal-number first and second portions (412₁, 412₂; 412₃, 412₄), and the beamformer arrangement (8) forms the elevation difference beam by taking the difference between signals received by the first and second portions of the array of antenna elements.

Thus, a land-based approach radar arrangement according to an aspect of the invention comprises an array antenna (410) (410) for at least receiving target signals (16, 18a, 18b). The array antenna (410) comprises a plurality of antenna (410) elements (6) arranged in an array of rows (12r) and columns 12c) to thereby define a planar array plane (7). The arrangement also comprises a beamformer (8) coupled to the plurality of antenna (410) elements (6), for controlling at least one electrical parameter (phase or amplitude) of signals traversing the antenna (410) elements (6), for forming at least a sum beam (Σ) generally orthogonal to the array plane (7), and for forming a difference beam (Δ, also generally orthogonal to the array plane (7). An array antenna (410) mount (7M), mounts the array of antenna (410) elements with both the rows (12r) and the columns (12cd) skewed relative to a horizontal plane. An angle determining arrangement (710, 714) is coupled to the beamformer (8), for converting a target position in the antenna (410) coordinates to a target position in horizontal and vertical coordinates. In a particularly advantageous manifestation of this aspect of the invention, the rows and columns of the array are skewed relative to the horizontal plane by 45°. In one version of this aspect of the invention, the array plane is tilted back relative to the vertical, and the amount of tiltback may lie in the range of 1° to 45°. The overall shape of the antenna array may be rectangular, but is preferably square. When the antenna array is rectangular or square, the vertices of the rectangle or square may be removed.

In a particular embodiment of the arrangement according to this aspect of the invention, the array of antenna (410) elements is divided about one of the rows (12r) and columns (12c) into first and second portions, each of the first and second portions having substantially the same number of the the one of the rows and columns. In this particular embodiment, the beamformer (8) forms the elevation difference beam by taking the difference between signals received by the first and second portions of the array of antenna (410) elements.

A method according to another aspect of the invention provides land-based precision approach radar services. The method comprises the step of providing an array antenna (410) for at least receiving target signals, the array antenna (410) comprising a plurality of antenna (410) elements (6) arranged in an array of rows (12r) and columns (12c) to thereby define a planar array plane (7). The target signals are beamformed for forming at least a sum beam generally orthogonal to the array plane, and for forming a difference beam, also generally orthogonal to the array plane. The array of antenna (410) elements is mounted with both the rows (12r) and the columns (12c) skewed relative to a horizontal plane. A target position in antenna coordinates is converted to a target position in horizontal and vertical coordinates. The array may be tilted back in order to direct at least one of the sum and difference beams generally upward.

What is claimed is:

1. A land-based approach radar arrangement comprising:
   an array antenna for at least receiving target signals, said array antenna comprising a plurality of antenna elements arranged in an array of rows and columns;
   beamforming means coupled to said plurality of antenna elements, for controlling at least one electrical parameter of signals traversing said antenna elements, for forming at least a sum beam, and for forming a difference beam;
   array antenna mounting means, for mounting said array of antenna elements on land with both said rows and said columns skewed relative to a horizontal plane in an earth-fixed coordinate system; and
   angle determining means coupled to said beamforming means, for converting a target position in the antenna coordinates to a target position in horizontal and vertical coordinates.

2. An arrangement according to claim 1, wherein said array of antenna elements is divided about one of said rows and columns into first and second portions, each of said first and second portions having substantially the same number of said one of said rows and columns, and said beamformer forms said elevation difference beam by taking the difference between signals received by said first and second portions of said array of antenna elements.

3. An arrangement according to claim 1, wherein said array plane is tilted back relative to the horizontal plane.

4. An arrangement according to claim 1, wherein said tiltback of said array plane relative to said horizontal plane is in the range of 1° to 45°.

5. An arrangement according to claim 1, wherein said skew of each of said rows and columns relative to the horizontal plane is 45°.

6. An arrangement according to claim 1, wherein said array of antenna elements has a rectangular shape.

7. An arrangement according to claim 6, wherein said rectangular shape is a square shape.

8. An arrangement according to claim 1, wherein said difference beam is an elevation difference beam in antenna coordinates.

9. An arrangement according to claim 1, wherein said sum beam and said difference beam are generally orthogonal to an array plane defined by said rows and columns.

10. A method for providing land-based precision approach radar services, said method comprising the steps of:
    providing an array antenna for at least receiving target signals, said array antenna comprising a plurality of antenna elements arranged in an array of rows and columns to thereby define a planar array plane;
    beamforming said target signals for forming at least a sum beam generally orthogonal to said array plane, and for forming a difference beam, also generally orthogonal to said array plane;
    mounting said array of antenna elements on land with both said rows and said columns skewed relative to a horizontal plane in an earth-fixed coordinate system; and
    converting a target position in the antenna coordinates to a target position in horizontal and vertical coordinates.

11. A method according to claim 10, further comprising the step of tilting said array back in order to direct at least one of said sum and difference beams generally upward.

* * * * *